US012327941B2

(12) United States Patent
Kinney et al.

(10) Patent No.: US 12,327,941 B2
(45) Date of Patent: Jun. 10, 2025

(54) PASS-THROUGH CONNECTORS FOR CONNECTOR SYSTEMS

(71) Applicant: Apple Inc., Cupertino, CA (US)

(72) Inventors: Michael A. Kinney, San Francisco, CA (US); Mahmoud R. Amini, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 750 days.

(21) Appl. No.: 17/482,879

(22) Filed: Sep. 23, 2021

(65) Prior Publication Data

US 2023/0087891 A1 Mar. 23, 2023

(51) Int. Cl.
*H01R 13/24* (2006.01)
*H01R 12/70* (2011.01)

(52) U.S. Cl.
CPC .................................. *H01R 12/707* (2013.01)

(58) Field of Classification Search
CPC .............. H01R 12/707; H01R 2105/00; H01R 12/7076; H01R 12/714; H01R 13/2421; H01R 13/405; H01R 13/504; H01R 12/7082
See application file for complete search history.

(56) References Cited

U.S. PATENT DOCUMENTS 5,355,282 A * 10/1994 Yokemura ............ H05K 7/1061 361/744
5,633,597 A * 5/1997 Stowers ............. G01R 1/07314 324/754.11
5,980,335 A * 11/1999 Barbieri ............... H01R 12/716 439/824
6,244,884 B1 * 6/2001 Kerul ................. H01R 13/7033 439/817
6,431,912 B1 * 8/2002 Mori .................. H01R 13/2421 439/587
6,546,618 B1 * 4/2003 Yagawa .................. B21J 15/10 227/62
7,306,494 B2 * 12/2007 Soh .................... H01R 13/2442 439/862
7,662,000 B2 * 2/2010 Hou ................... H01R 13/2421 439/700
9,075,566 B2 * 7/2015 Whitt, III ................ G06F 1/166
9,331,415 B2 * 5/2016 Tagawa .............. H01R 13/2442
10,651,594 B1 * 5/2020 Tsai ....................... A47L 9/2894
10,658,789 B1 * 5/2020 Wang ..................... H01R 24/28
10,777,928 B1 * 9/2020 Yen ....................... G01R 1/0416
2003/0040201 A1 * 2/2003 Ishizuka .............. H01R 12/714 439/66
2003/0186567 A1 * 10/2003 Kuwabara .......... H01R 13/2421 439/66

(Continued)

*Primary Examiner* — Abdullah A Riyami
*Assistant Examiner* — Nelson R. Burgos-Guntin
(74) *Attorney, Agent, or Firm* — Kilpatrick Townsend & Stockton LLP

(57) ABSTRACT

Methods and apparatus that can allow an electronic device housed in a protective accessory to communicate with another electronic device, and are readily manufactured. An example can provide a connector assembly that can include a number of top contacts electrically connected to a corresponding number of bottom contacts. The top contacts can be spaced at a first pitch while the bottom contacts can be spaced at a second pitch, the second pitch different than the first pitch.

18 Claims, 8 Drawing Sheets

(56) References Cited

U.S. PATENT DOCUMENTS

| | | | | |
|---|---|---|---|---|
| 2004/0005791 | A1* | 1/2004 | Sato | H01R 13/2421 439/66 |
| 2004/0077225 | A1* | 4/2004 | Chun-Fu | H01R 13/2471 439/700 |
| 2005/0064738 | A1* | 3/2005 | Zheng | H01R 13/2421 439/65 |
| 2005/0101195 | A1* | 5/2005 | Zhu | H01R 13/2421 439/700 |
| 2005/0227511 | A1* | 10/2005 | Sun | H01R 12/7082 439/66 |
| 2007/0082515 | A1* | 4/2007 | Goodman | H05K 7/1061 439/70 |
| 2009/0023347 | A1* | 1/2009 | Hou | H01R 13/2421 439/824 |
| 2009/0247004 | A1* | 10/2009 | Lou | H01R 13/41 439/500 |
| 2011/0279140 | A1* | 11/2011 | Uesaka | H01R 12/714 439/55 |
| 2013/0035006 | A1* | 2/2013 | Park | H01R 13/2435 439/862 |
| 2013/0040473 | A1* | 2/2013 | Tanaka | H01R 13/2414 439/86 |
| 2014/0170886 | A1* | 6/2014 | Kikuchi | H01R 13/424 439/345 |
| 2015/0295329 | A1* | 10/2015 | Oguro | G03B 17/14 439/676 |
| 2016/0134037 | A1* | 5/2016 | Ju | H01R 13/2428 439/660 |
| 2017/0346210 | A1* | 11/2017 | Nagashima | H01R 13/08 |
| 2018/0277991 | A1* | 9/2018 | Endo | H01R 13/6315 |
| 2018/0375244 | A1* | 12/2018 | Wagman | H01R 13/428 |
| 2019/0379154 | A1* | 12/2019 | Nishijima | H01R 13/748 |
| 2020/0099163 | A1* | 3/2020 | Tziviskos | H01F 7/02 |
| 2020/0119481 | A1* | 4/2020 | Struyk | H01R 12/714 |
| 2020/0141975 | A1* | 5/2020 | Hironaka | G01R 1/045 |
| 2020/0161800 | A1* | 5/2020 | Liao | H01R 13/5219 |
| 2020/0225488 | A1* | 7/2020 | Goupil | G02B 27/0172 |
| 2020/0241660 | A1* | 7/2020 | Lin | G06F 3/03545 |
| 2020/0287323 | A1* | 9/2020 | Lee | H01R 13/64 |

* cited by examiner

PASS-THROUGH CONNECTORS FOR CONNECTOR SYSTEMS

BACKGROUND

The number of types of electronic devices that are commercially available has increased tremendously the past few years and the rate of introduction of new devices shows no signs of abating. Devices, such as tablet, laptop, netbook, desktop, and all-in-one computers, cell, smart, and media phones, storage devices, portable media players, navigation systems, monitors, and others, have become ubiquitous.

Power and data can be provided from one device to another over cables that can include one or more wire conductors, fiber optic cables, or other conductors. Connector inserts can be located at each end of these cables and can be inserted into connector receptacles in the communicating or power transferring devices. In other systems, contacts on the devices can come into direct contact with each other without the need for intervening cables.

In some electronic systems, while it might be desirable for contacts on two electronic devices to come into direct contact with each other, this might not be possible when one of the devices is housed in a case, cover, or other protective accessory. This can lead to situations where the protective accessory needs to be removed from an electronic device before the electronic device can share power or communicate with another electronic device. Accordingly, it can be desirable for the two electronic devices to be able to communicate or share power without removing the protective accessory.

The demand for these electronic devices and protective accessories can be tremendous. Accordingly, it can be desirable that an apparatus to can allow an electronic device housed in a protective accessory to communicate and share power with another electronic device be readily manufactured such that demand for these products can be met.

Thus, what is needed are methods and apparatus that can allow an electronic device housed in a protective accessory to communicate with another electronic device, and are readily manufactured.

SUMMARY

Accordingly, embodiments of the present invention can provide methods and apparatus that can allow an electronic device housed in a protective accessory to communicate with another electronic device, and are readily manufactured.

An illustrative embodiment of the present invention can provide a connector assembly that can allow an intermediate accessory to connect two electronic devices together such that they can share power and data. The intermediate accessory can be a protective accessory such as a case, cover, or other protective accessory, though these and other embodiments of the present invention can be incorporated into other types of accessories or electronic devices. The intermediate accessory can be a case that can be attached to a first electronic device. The protective case can include a connector assembly that can allow the first electronic device to communicate with a second electronic device without the need of intervening cables and without the protective case having to be removed.

These and other embodiments of the present invention can provide a case or other protective structure for a first electronic device. The first electronic device can include a first connector assembly having a number of contacts. The case can include a second connector assembly having a number of top contacts arranged to align with the contacts in the first connector assembly. The top contacts in the second connector assembly can connect to bottom contacts in the second connector assembly. A second electronic device can include third connector assembly having a number of contacts. The bottom contacts in the second connector assembly can be arranged to align with the contacts of the third connector assembly. The contacts in the first connector assembly can physically and electrically connect to the top contacts in the second connector assembly. The contacts in the third connector assembly can physically and electrically connect to the bottom contacts in the second connector assembly. The top contacts in the second connector assembly can physically and electrically connect to the bottom contacts in the second connector assembly. The top contacts can be spaced at a first pitch and the bottom contacts can be spaced at a second pitch, the second pitch different than the first pitch. The top contacts can be spaced at a first pitch and the bottom contacts can be spaced at a second pitch, the second pitch smaller than the first pitch. The top contacts can be spaced at a first pitch and the bottom contacts can be spaced at a second pitch, the second pitch larger than the first pitch.

These and other embodiments of the present invention can provide a connector assembly for an intermediate accessory. The connector assembly can include a number of top contacts. Each top contact can include a cap, a terminal comprising feet, and a spring at least partially housed by the cap and the terminal. The spring can bias the cap and can allow the cap to be depressed into the terminal. The connector assembly can further include a top housing having a plurality of openings, where a cap of a corresponding top contact can be exposed in each of the plurality of openings. The connector assembly can further include a number of bottom contacts having a top surface and a bottom contacting surface, wherein the feet of each terminal can be fixed to a top surface of a corresponding bottom contact. A bottom housing can be molded around portions of each terminal of the plurality of top contacts and each top surface of the plurality of bottom contacts, or the bottom housing can be molded around the plurality of bottom contacts and each terminal can be spot or laser-welded to the top surface of a bottom contact through openings in the bottom housing. The top contacts can be spaced at a first pitch and the bottom contacts can be spaced at a second pitch, the second pitch different than the first pitch. The top contacts can be spaced at a first pitch and the bottom contacts can be spaced at a second pitch, the second pitch smaller than the first pitch. The top contacts can be spaced at a first pitch and the bottom contacts can be spaced at a second pitch, the second pitch larger than the first pitch.

The components of these connector assemblies can be formed of various materials. For example, the contacts and their constituent parts and other conductive portions of the connector assemblies can be formed by drawing, machining, stamping, forging, metal-injection molding, machining, micro-machining, 3-D printing, or other manufacturing process. These conductive portions can be formed of stainless steel, steel, copper, copper titanium, phosphor bronze, or other material or combination of materials. They can be plated or coated with one or more layers of nickel, palladium, palladium-nickel, gold, or other material or combination of materials.

The nonconductive portions, such as various housings, moldings, and other nonconductive portions can be formed using injection or other molding, 3-D printing, machining, or other manufacturing process. The nonconductive portions can be formed of silicon or silicone, rubber, hard rubber, plastic, nylon, glass-filled nylon, elastomers, liquid-crystal polymers (LCPs), ceramics, or other nonconductive material or combination of materials. The adhesives can be pressure sensitive adhesives, heat activated films, polyimide films, or other adhesives.

Embodiments of the present invention can provide connector assemblies that can be located in various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These connector assemblies can provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. In one example, the connector assemblies can be used to convey a data signal, a power supply, and ground. In various embodiments of the present invention, the data signal can be unidirectional or bidirectional and the power supply can be unidirectional or bidirectional.

Various embodiments of the present invention can incorporate one or more of these and the other features described herein. A better understanding of the nature and advantages of the present invention can be gained by reference to the following detailed description and the accompanying drawings.

DESCRIPTION OF EXEMPLARY EMBODIMENTS

Figure 1:
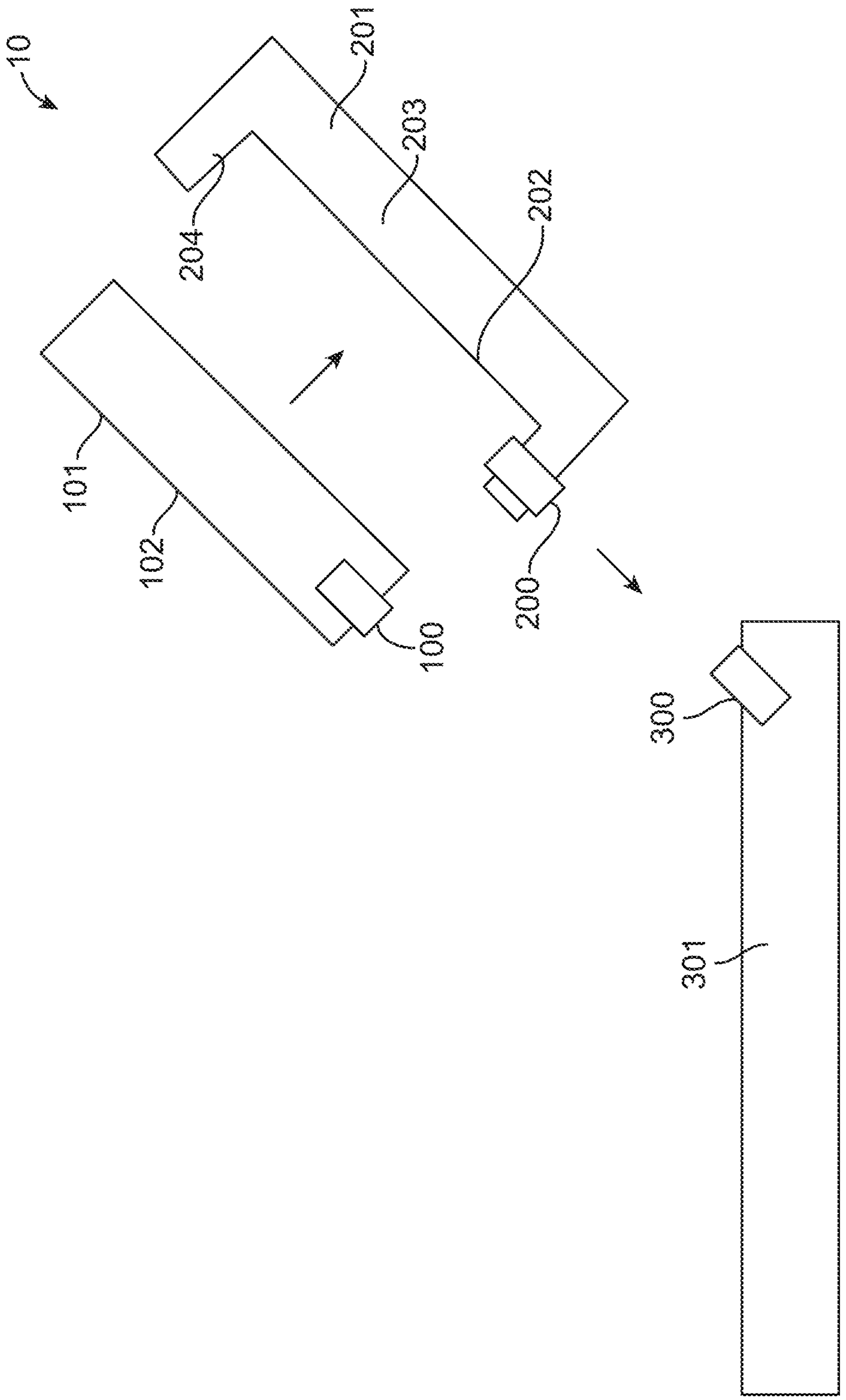
FIG. 1 illustrates an electronic system according to an embodiment of the present invention.

FIG. 1 illustrates an electronic system according to an embodiment of the present invention. This figure, as with the other included figures, is shown for illustrative purposes and does not limit either the possible embodiments of the present invention or the claims.

FIG. 1 illustrates an electronic system 10 according to an embodiment of the present invention. Intermediate accessory 201 can be a protective case arranged to accept first electronic device 101 in recess 202 such that screen 102 of first electronic device 101 can be viewed. First electronic device 101 can communicate with second electronic device 301. Intermediate accessory 201 can provide electronic paths for data and power to be shared between first electronic device 101 and second electronic device 301.

Figure 2:
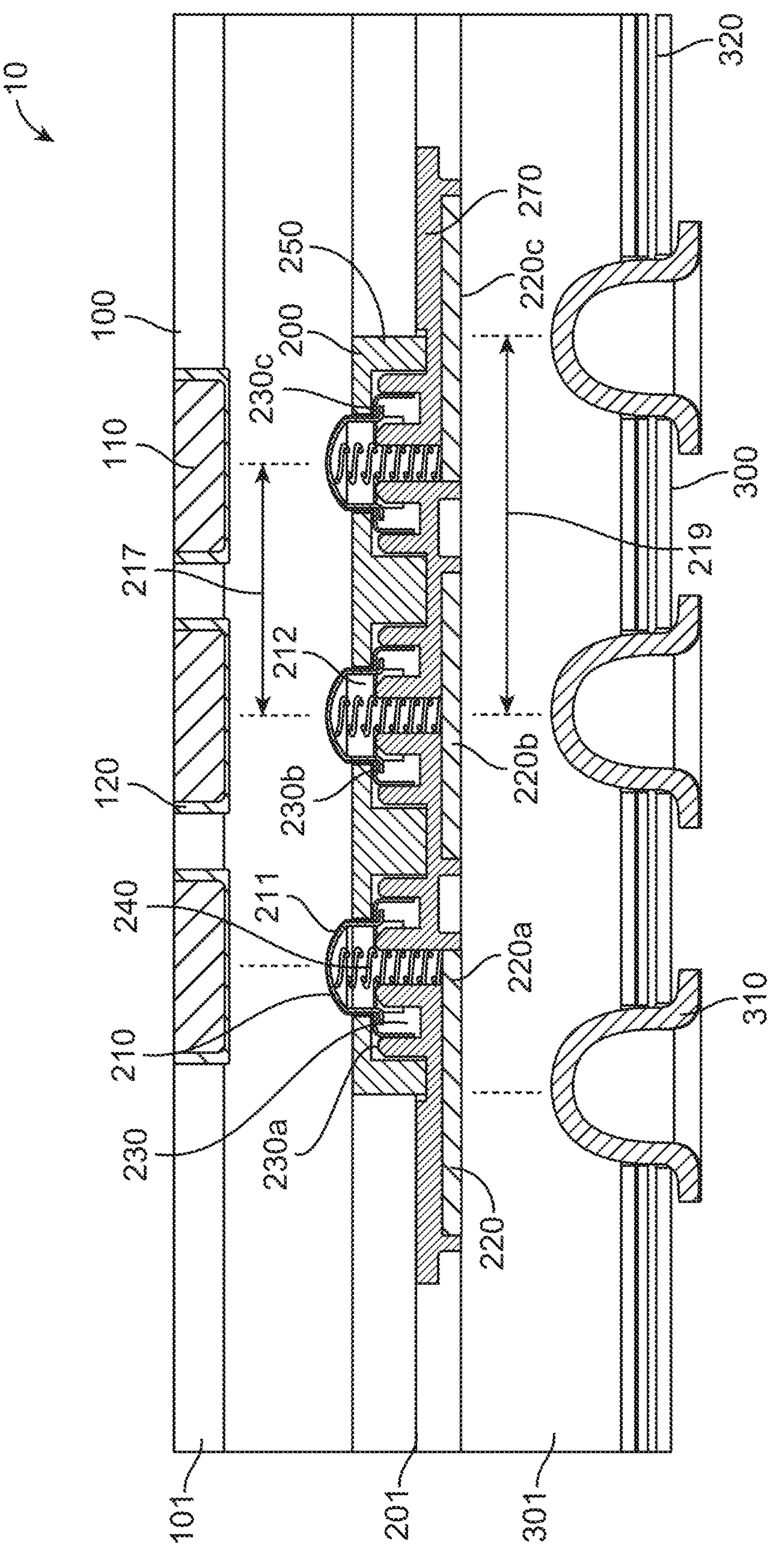
FIG. 2 illustrates a cutaway side-view of an electronic system according to an embodiment of the present invention.

First electronic device 101 can include a first connector assembly 100 having a number of contacts 110 (shown in FIG. 2.) Intermediate accessory 201 can include second connector assembly 200 having a number of top contacts 210 (shown in FIG. 2) arranged to align with contacts 110 in first connector assembly 100. Intermediate accessory 201 can include back panel 203 having rim 204 around an outer edge, where second connector assembly can be located in rim 204. Top contacts 210 in second connector assembly 200 can connect to bottom contacts 220 (shown in FIG. 2) in second connector assembly 200. Second electronic device 301 can include third connector assembly 300 having a number of contacts 310 (shown in FIG. 2.) Bottom contacts 220 in second connector assembly 200 can be arranged to align with contacts 310 of third connector assembly 300. Contacts 110 in first connector assembly 100 can physically and electrically connect to top contacts 210 in second connector assembly 200. Contacts 310 in third connector assembly 300 can physically and electrically connect to bottom contacts 220 in second connector assembly 200. Top contacts 210 in second connector assembly 200 can physically and electrically connect to bottom contacts 220 in second connector assembly 200. Top contacts 210 can be spaced at a first pitch and bottom contacts 220 can be spaced at a second pitch, the second pitch different than the first pitch. Top contacts 210 can be spaced at a first pitch and bottom contacts 220 can be spaced at a second pitch, the second pitch smaller than the first pitch. Top contacts 210 can be spaced at a first pitch and bottom contacts 220 can be spaced at a second pitch, the second pitch larger than the first pitch.

As shown in FIG. 1, first electronic device 101 and intermediate accessory 201 can mate with second electronic device 301 at an angle. To facilitate this, various magnets, stands, and other features can implemented in either or both intermediate accessory 201 and second electronic device 301. Also, while connector assembly 200 is shown as being located in rim 204 of intermediate accessory 201, connector assembly 200 can be positioned elsewhere in intermediate accessory 201, for example in back panel 203.

In these and other embodiments of the present invention, intermediate accessory 201 can be a protective case, decorative case, cover, or other accessory or electronic device. First electronic device 101 can be a phone, a tablet device, a portable computing device, or other electronic device. Second electronic device 301 can be a keyboard, a power adapter, a phone tablet device, a portable computing device, or other electronic device.

FIG. 2 illustrates a cutaway side-view of an electronic system according to an embodiment of the present invention. Electronic system 10 can include first electronic device 101 and second electronic device 301. Intermediate accessory 201 can provide electronic connections over which first electronic device 101 and second electronic device 301 can share power and data. Intermediate accessory 201 can be a case, cover, or other accessory for first electronic device 101. Intermediate accessory 201 can be a case, cover, or other accessory for second electronic device 301.

First electronic device 101 can include connector assembly 100. Connector assembly 100 can include contacts 110. Contacts 110 can be insulated with insulating layers 120. In these and other embodiments of the present invention, a connector assembly, such as connector assembly 100, can be comprised of one or more contacts, such as contacts 110.

Intermediate accessory 201 can include connector assembly 200. Connector assembly 200 can include top contacts 210. Top contacts 210 can include cap 211 and terminal 230. Cap 211 can be physically and electrically connected to and constrained in its movements by terminal 230. Feet 232 (shown in FIG. 4) of terminals 230 can be attached to a top side of bottom contacts 220. Bottom housing 270 can be molded around portions of bottom contacts 220. Cap 211 can include recess 212. Spring 240 can be located in recess 212, terminal 230, and bottom housing 270. Spring 240 can bias cap 211 and can allow cap 211 to be depressed. Connector assembly 200 can further include top housing 250. Top housing 250 can be attached to bottom housing 270 with adhesives 260 (shown in FIG. 3.)

Second electronic device 301 can include connector assembly 300. Connector assembly 300 can include housing 320 supporting contacts 310.

Top contacts 210 of connector assembly 200 can have a pitch 217. Pitch 217 can be configured to match a pitch of contacts 110 in connector assembly 100 of first electronic device 101. Bottom contacts 220 of connector assembly 200 can have a pitch 219. Pitch 219 can be configured to match a pitch of contacts 310 in connector assembly 300 of second electronic device 301. In these and other embodiments of the present invention, pitch 217 can be the same or substantially similar to pitch 219. In these and other embodiments of the present invention, pitch 217 can be larger than pitch 219. In these and other embodiments of the present invention, pitch 219 can be larger than pitch 217. The difference between pitch 217 and pitch 219 can be provided for by differences in the positioning of bottom contacts 220 relative to terminals 230. In this example, a central terminal 230*b* can be aligned with a center of the center bottom contact 220*b*, while the outside terminal 230*a* can be aligned towards a right edge of outside bottom contact 220*a* and outside terminal 230*c* can be aligned towards left edge of outside bottom contact 220*c*.

Contacts 110 in first connector assembly 100 can physically and electrically connect to top contacts 210 in second connector assembly 200. Contacts 310 in third connector assembly 300 can physically and electrically connect to bottom contacts 220 in second connector assembly 200. Top contacts 210 in second connector assembly 200 can physically and electrically connect to bottom contacts 220 in second connector assembly 200.

Figure 3:
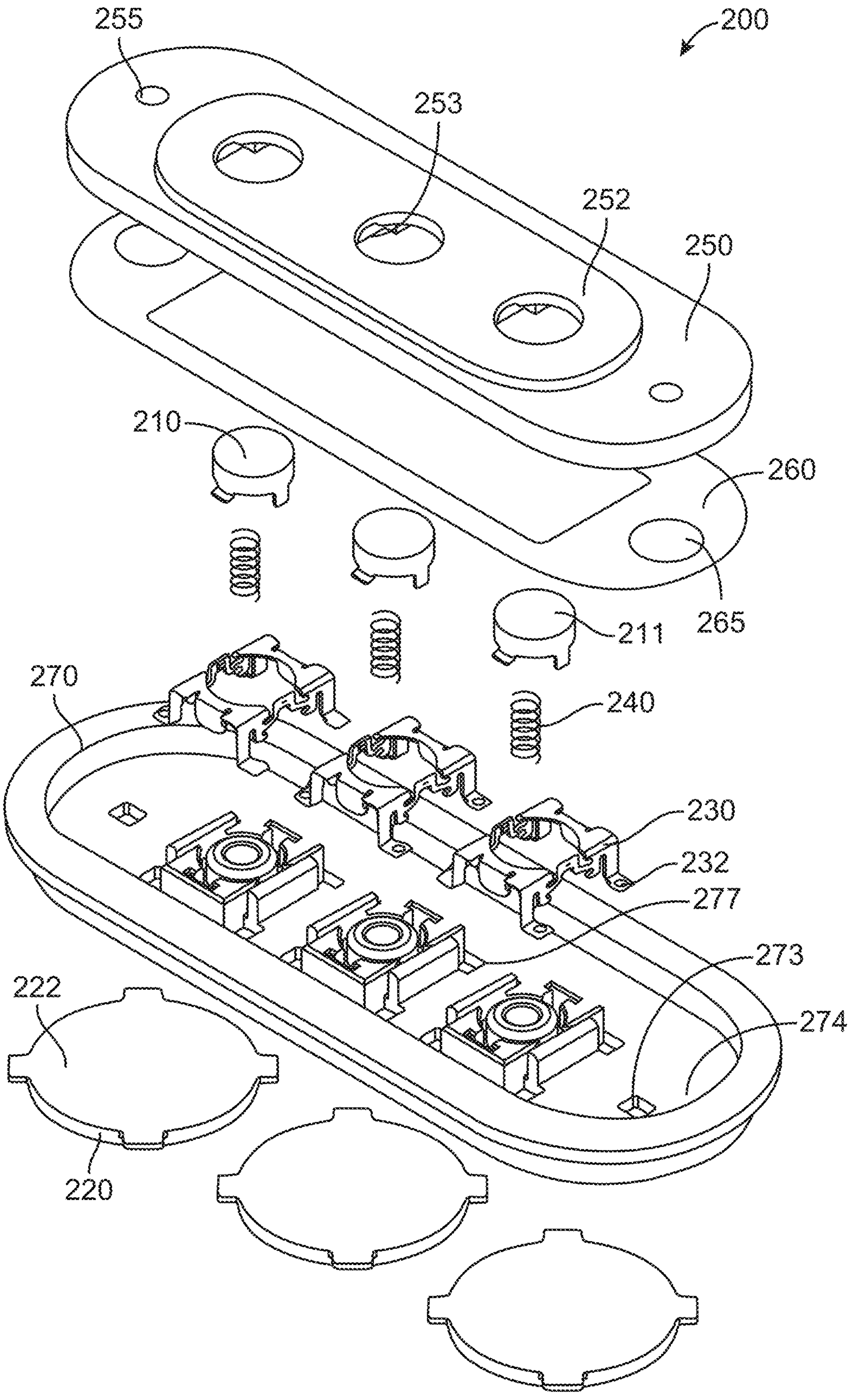
FIG. 3 is an exploded diagram of a connector assembly for an intermediate accessory according to an embodiment of the present invention.

FIG. 3 is an exploded diagram of a connector assembly for an intermediate accessory according to an embodiment of the present invention. Connector assembly 200 can include a number of top contacts 210. Top contacts 210 can include cap 211, terminal 230, and spring 240. Cap 211 can include recess 212 (shown in FIG. 2.) Spring 240 can fit in recess 212. Cap 211 can be physically and electrically connected to terminal 230. Cap 211 can be constrained in its motion by terminal 230. Cap 211 can be constrained to a primarily vertical movement and can be biased by spring 240. Spring 240 can allow cap 211 to be depressed in a downward direction as drawn.

Terminals 230 can include feet 232. Feet 232 can be attached to top surface 222 of bottom contacts 220, for example by soldering, spot welding, or laser welding. Bottom housing 270 can be formed around portions of terminal 230 and bottom contacts 220, or bottom housing 270 can be formed around bottom contacts 220 and then feet 232 of terminals 430 can be soldered, spot welded, or laser welded to top surface 222 of bottom contact 220 through housing opening 277. Bottom housing 270 can include recess 274. Top housing 250 can be arranged to fit in recess 274. Top housing 250 can include first raised portion 252 around a number of openings 253. Caps 211 of top contacts 210 can fit in openings 253 in top housing 250.

Top housing 250 can be attached to bottom housing 270 with adhesive 260. Adhesive 260 can be a pressure-sensitive adhesive, heat-activated film, polyimide film, or other type of adhesive. Additional features can be included to secure top housing 250 to bottom housing 270. For example, fasteners can be passed through openings 255 in top housing 250 and openings 265 in adhesive 260, and into openings 273 in recess 274 of bottom housing 270. Alternatively, one or more tabs (not shown) on an underside of top housing 250 can fit through openings 265 of adhesive 260 and into openings 273 in recess 274 of bottom housing 270.

Figure 4A:
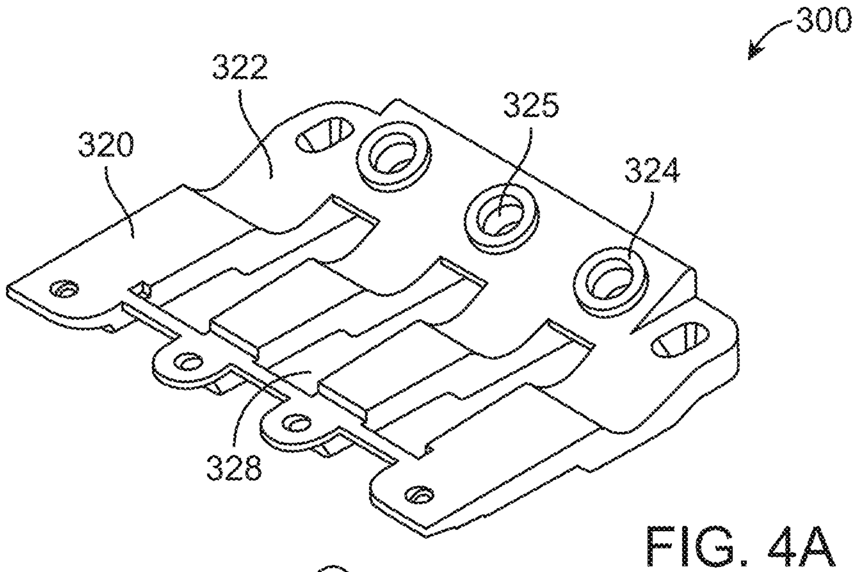
FIGS. 4A through 4C illustrate a method of manufacturing a connector assembly according to an embodiment of the present invention.
Figure 4B:
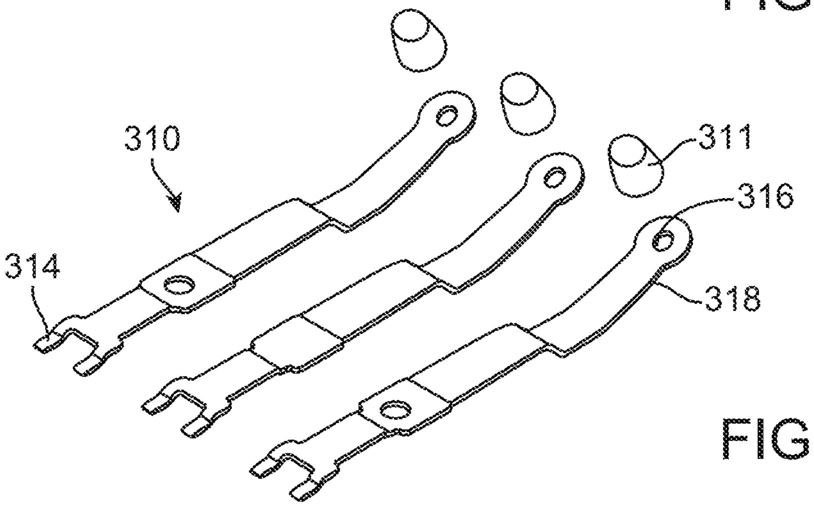
Figure 4C:
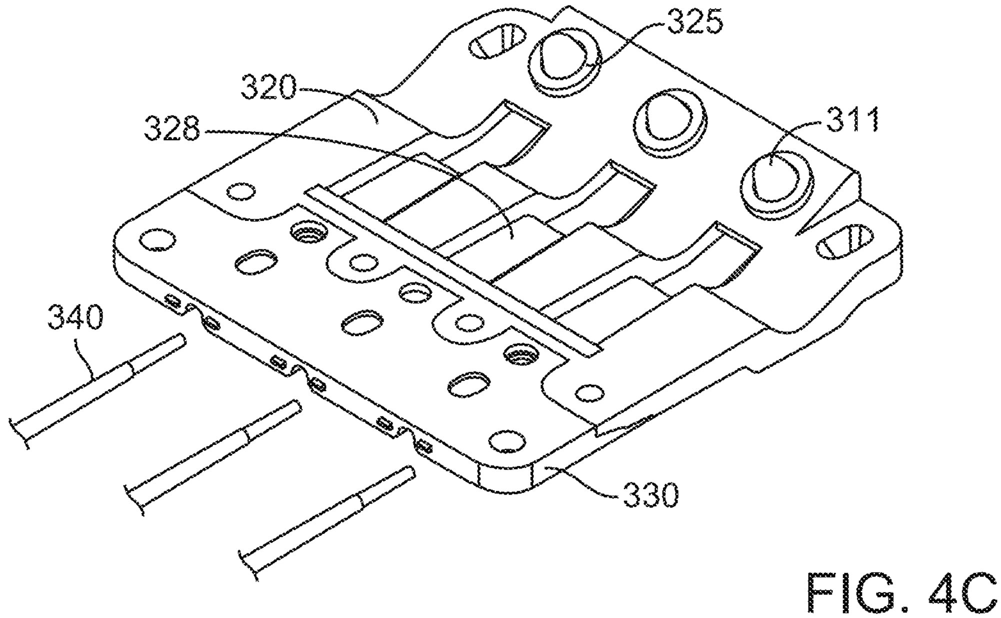

FIGS. 4A through 4C illustrate a method of manufacturing a connector assembly according to an embodiment of the present invention. In FIG. 4A, housing 320 of connector assembly 300 can be formed by molding or other process. Housing 320 can include a number of slots 328 and a number of openings 325. Openings 325 can be ringed by raised portions 324. Housing 320 can include sloped portion 322. Sloped portion 322 can facilitate the mating of intermediate accessory 201 and connector assembly 200 with second electronic device 301 and connector assembly 300 when intermediate accessory 201 is at an angle relative to second electronic device 301 (all shown in FIG. 1.)

In FIG. 4B, a number of contacts 310 can be formed by stamping or other process. Contacts 310 can include contacting portions 311. Contacting portions 311 can be fixed to ends 316 of contacts bodies 318, for example by soldering, spot welding, or laser welding. In FIG. 4C, contacts 310 (shown in FIG. 4B) can be positioned in slots 328 of housing 320 such that contacting portions 311 are available at 325. Overmolding 330 can be used to fix contact tails 314 (shown in FIG. 4B) to housing 320. Contact tails 314 of contact bodies 318 can be connected to contacts on a board or other conduits, such as wires 340.

Figure 5:
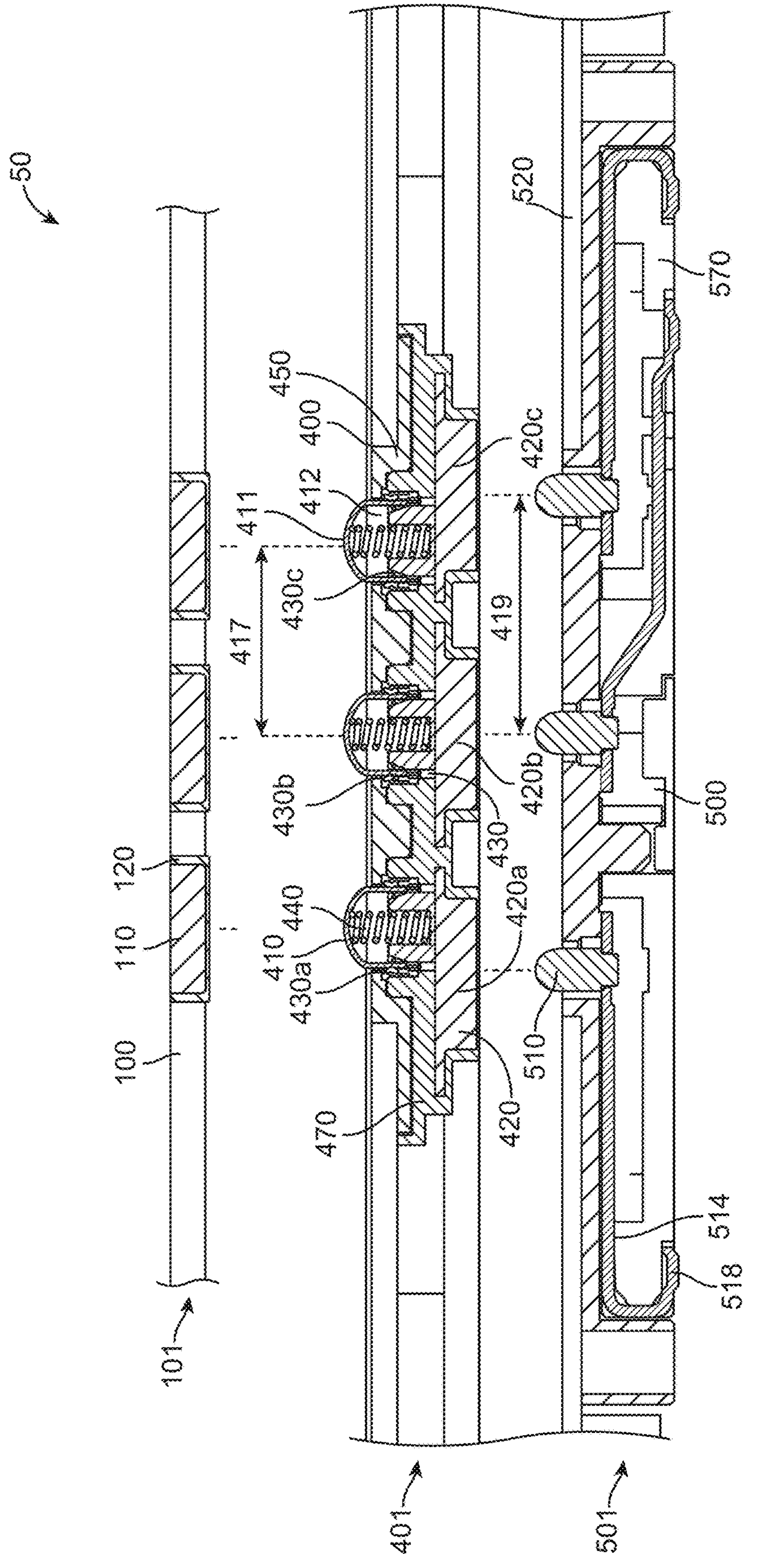
FIG. 5 illustrates a cutaway side-view of another electronic system according to an embodiment of the present invention.

FIG. 5 illustrates a cutaway side-view of an electronic system according to an embodiment of the present invention. Electronic system 50 can be substantially the same as or similar to electronic system 10 (shown in FIG. 2.) Intermediate accessory 401 can be the same or similar to intermediate accessory 201 and second electronic device 501 can be the same or similar to second electronic device 301. In these and other embodiments of the present invention, these electronic devices and intermediate accessories can be used interchangeably. For example, intermediate accessory 201 can be used to connect electronic device 101 to either electronic device 301 or electronic device 501. Similarly, intermediate accessory 401 can be used to connect electronic device 101 to either electronic device 301 or electronic device 501.

Electronic system 50 can include first electronic device 101 and second electronic device 501. Intermediate accessory 401 can provide electronic connections over which first electronic device 101 and second electronic device 301 can share power and data. Intermediate accessory 401 can be a case, cover, or other accessory for first electronic device 101. Intermediate accessory 401 can be a case, cover, or other accessory for second electronic device 501.

First electronic device 101 can include connector assembly 100. Connector assembly 100 can include contacts 110. Contacts 110 can be insulated with insulating layers 120. In these and other embodiments of the present invention, a connector assembly, such as connector assembly 100, can be comprised of one or more contacts, such as contacts 110.

Intermediate accessory 401 can include connector assembly 400. Connector assembly 400 can include top contacts 410. Top contacts 410 can include cap 411 and terminal 430. Cap 411 can be physically and electrically connected to and constrained in its movements by terminal 430. Feet 432 (shown in FIG. 7) of terminals 430 can be attached to a top side of bottom contacts 420. Bottom housing 470 can be molded around portions of and bottom contacts 420. Cap 411 can include recess 412. Spring 440 can be located in recess 412, terminal 430, and bottom housing 470. Spring 440 can bias cap 411 and can allow cap 411 to be depressed. Connector assembly 400 can further include top housing 450. Top housing 450 can be attached to bottom housing 470 with adhesives 460 (shown in FIG. 3.)

Second electronic device 501 can include connector assembly 500. Connector assembly 500 can include top housing 520 supporting contacts 510. Contacts 510 can include contact bodies 514 and can terminate in surface-mount contacting portions 518.

Top contacts 410 of connector assembly 400 can have a pitch 417. Pitch 417 can be configured to match a pitch of contacts 110 in connector assembly 100 of first electronic device 101. Bottom contacts 420 of connector assembly 400 can have a pitch 419. Pitch 419 can be configured to match a pitch of contacts 510 in connector assembly 500 of second electronic device 501. In these and other embodiments of the present invention, pitch 417 can be the same or substantially similar to pitch 419. In these and other embodiments of the present invention, pitch 417 can be larger than pitch 419. In these and other embodiments of the present invention, pitch 419 can be larger than pitch 417. The difference between pitch 417 and pitch 419 can be provided for by differences in the positioning of bottom contacts 420 relative to terminals 430. In this example, a central terminal 430*b* can be aligned with a center of the center bottom contact 420*b*, while the outside terminal 430*a* can be aligned towards a right edge of outside bottom contact 420*a* and outside terminal 430*c* can be aligned towards left edge of outside bottom contact 420*c*.

Contacts 110 in first connector assembly 100 can physically and electrically connect to top contacts 410 in second connector assembly 400. Contacts 510 in third connector assembly 500 can physically and electrically connect to bottom contacts 420 in second connector assembly 400. Top contacts 410 in second connector assembly 400 can physically and electrically connect to bottom contacts 420 in second connector assembly 400.

Figure 6:
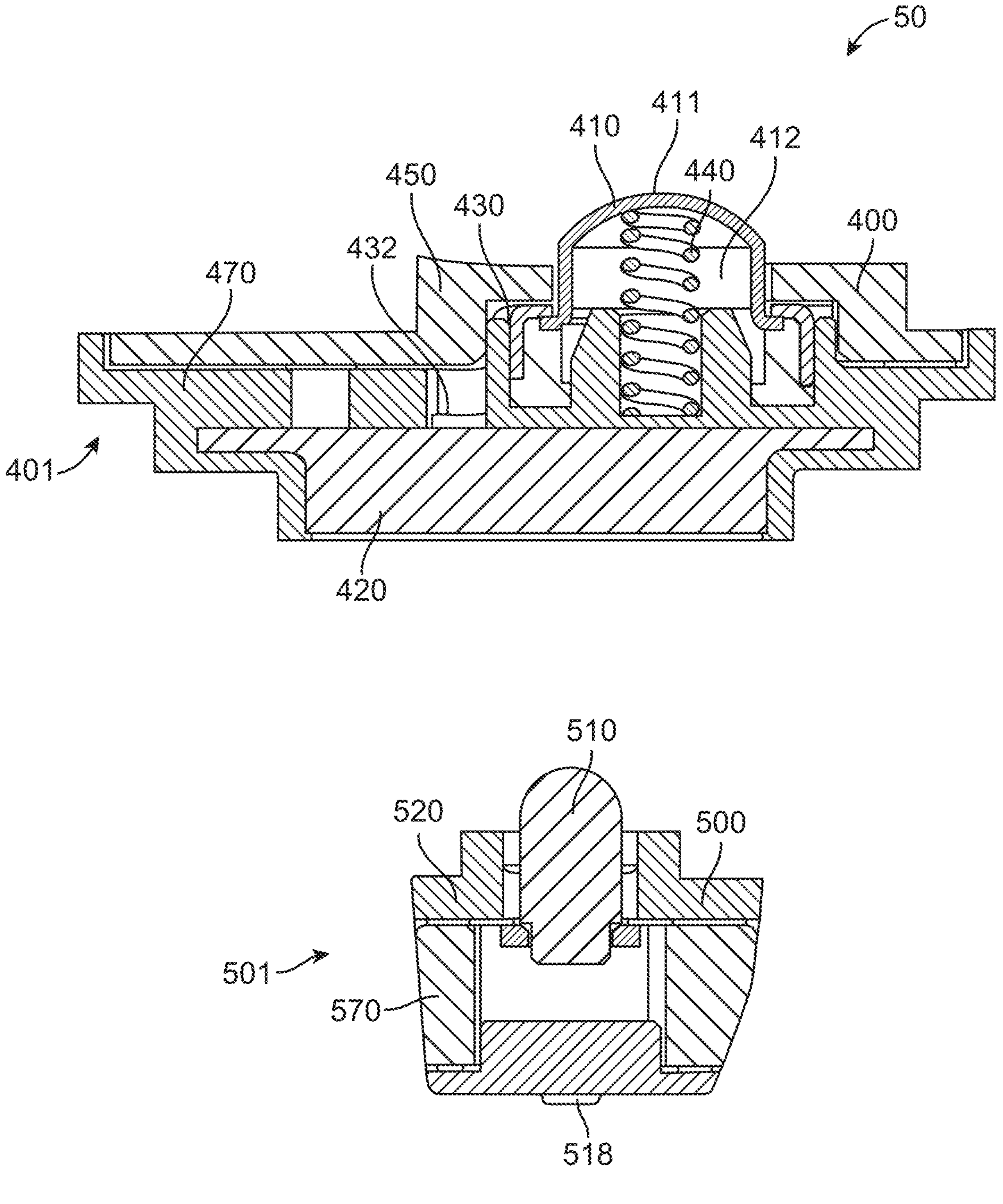
FIG. 6 illustrates a cutaway side-view of a portion of an electronic system according to an embodiment of the present invention.

FIG. 6 illustrates a cutaway side-view of a portion of an electronic system according to an embodiment of the present invention. Electronic system 50 can include first electronic device 101 (shown in FIG. 5) and second electronic device 501. Intermediate accessory 401 can provide electronic connections over which first electronic device 101 and second electronic device 301 can share power and data. Intermediate accessory 401 can be a case, cover, or other accessory for first electronic device 101. Intermediate accessory 401 can be a case, cover, or other accessory for second electronic device 501.

Intermediate accessory 401 can include connector assembly 400. Connector assembly 400 can include top contacts 410. Top contacts 410 can include cap 411 and terminal 430. Cap 411 can be physically and electrically connected to and constrained in its movements by terminal 430. Feet 432 of terminals 430 can be attached to a top side of bottom contacts 420. Bottom housing 470 can be molded around portions of bottom contacts 420. Cap 411 can include recess 412. Spring 440 can be located in recess 412, terminal 430, and bottom housing 470. Spring 440 can bias cap 411 and can allow cap 411 to be depressed. Connector assembly 400 can further include top housing 450. Top housing 450 can be attached to bottom housing 470 with adhesives 460 (shown in FIG. 7.)

Second electronic device 501 can include connector assembly 500. Connector assembly 500 can include top housing 520 and bottom housing 570 supporting contacts 510. Contacts 510 can terminate in surface-mount contacting portions 518. Surface-mount contacting portions 518 can be physically and electrically connected to contacts on a board, such as a flexible circuit board (not shown.)

Figure 7:
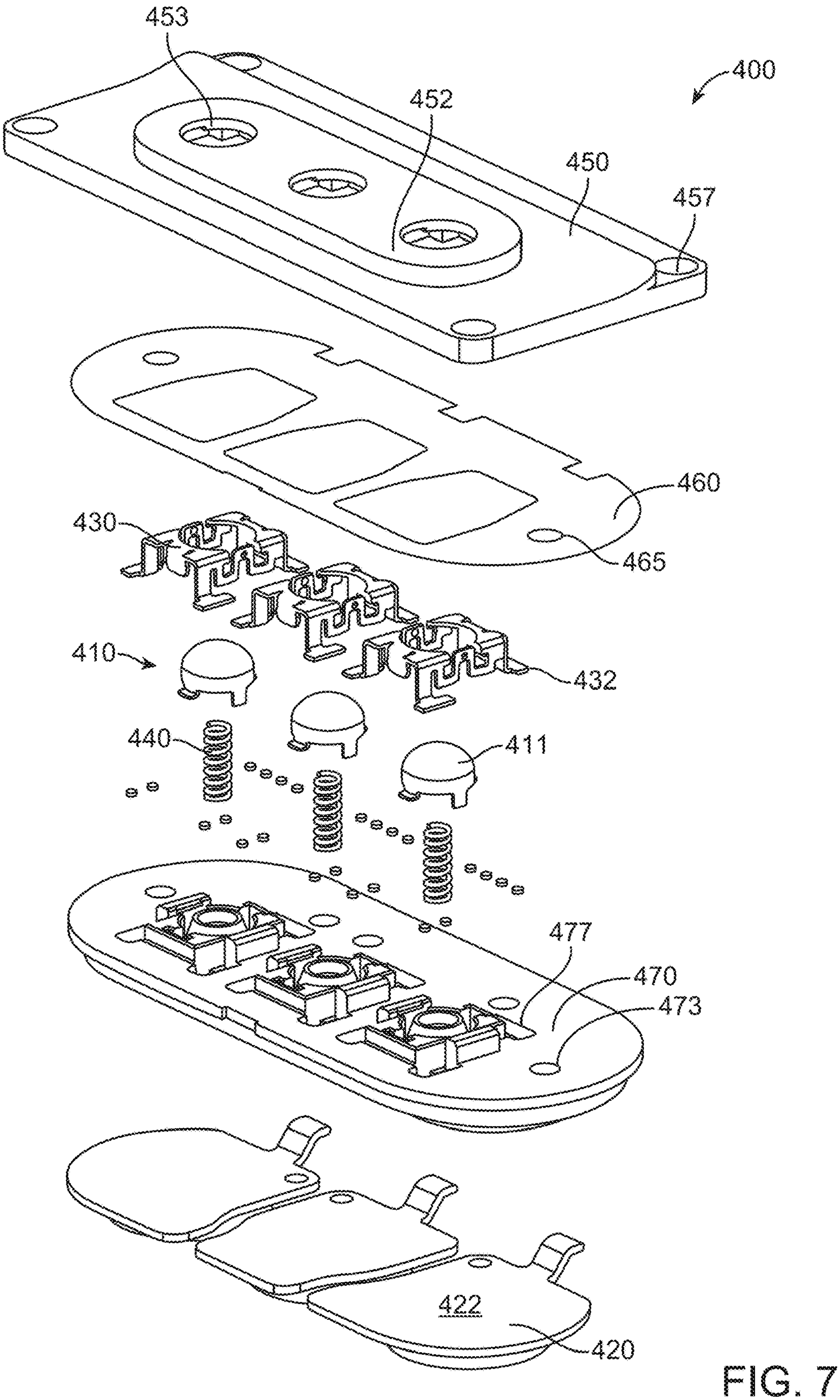
FIG. 7 is an exploded diagram of a connector assembly for an intermediate accessory according to an embodiment of the present invention.

FIG. 7 is an exploded diagram of a connector assembly for an intermediate accessory according to an embodiment of the present invention. Connector assembly 400 can include a number of top contacts 410. Top contacts 410 can include cap 411, terminal 430, and spring 440. Cap 411 can include recess 412 (shown in FIG. 4.) Spring 440 can fit in recess 412. Cap 411 can be physically and electrically connected to terminal 430. Cap 411 can be constrained in its motion by terminal 430. Cap 411 can be constrained to a primarily vertical movement and can be biased by spring 440. Spring 440 can allow cap 411 to be depressed in a downward direction as drawn.

Terminals 430 can include feet 432. Feet 432 can be attached to top surface 422 of bottom contacts 420, for example by soldering, spot welding, or laser welding. Bottom housing 470 can be formed around portions of terminals 430 and bottom contacts 420, or bottom housing 470 can be formed around bottom contacts 420 and then feet 432 of terminals 430 can be soldered, spot welded, or laser welded to top surface 422 of bottom contact 420 through housing opening 477. Top housing 450 can include first raised portion 452 around a number of openings 453. Caps 411 of top contacts 410 can fit in openings 453 in top housing 450.

Top housing 450 can be attached to bottom housing 470 with adhesive 460. Adhesive 460 can be a pressure-sensitive adhesive, heat-activated film, polyimide film, or other type of adhesive. Additional features can be included to secure top housing 450 to bottom housing 470. For example, fasteners (not shown) can be passed through opening 457 in top housing 450 and into a board (not shown) supporting connector assembly 400. Alternatively, one or more tabs (not shown) on an underside of top housing 450 can fit through opening 465 of adhesive 460 and into opening 473 in recess 474 of bottom housing 470.

Figure 8:
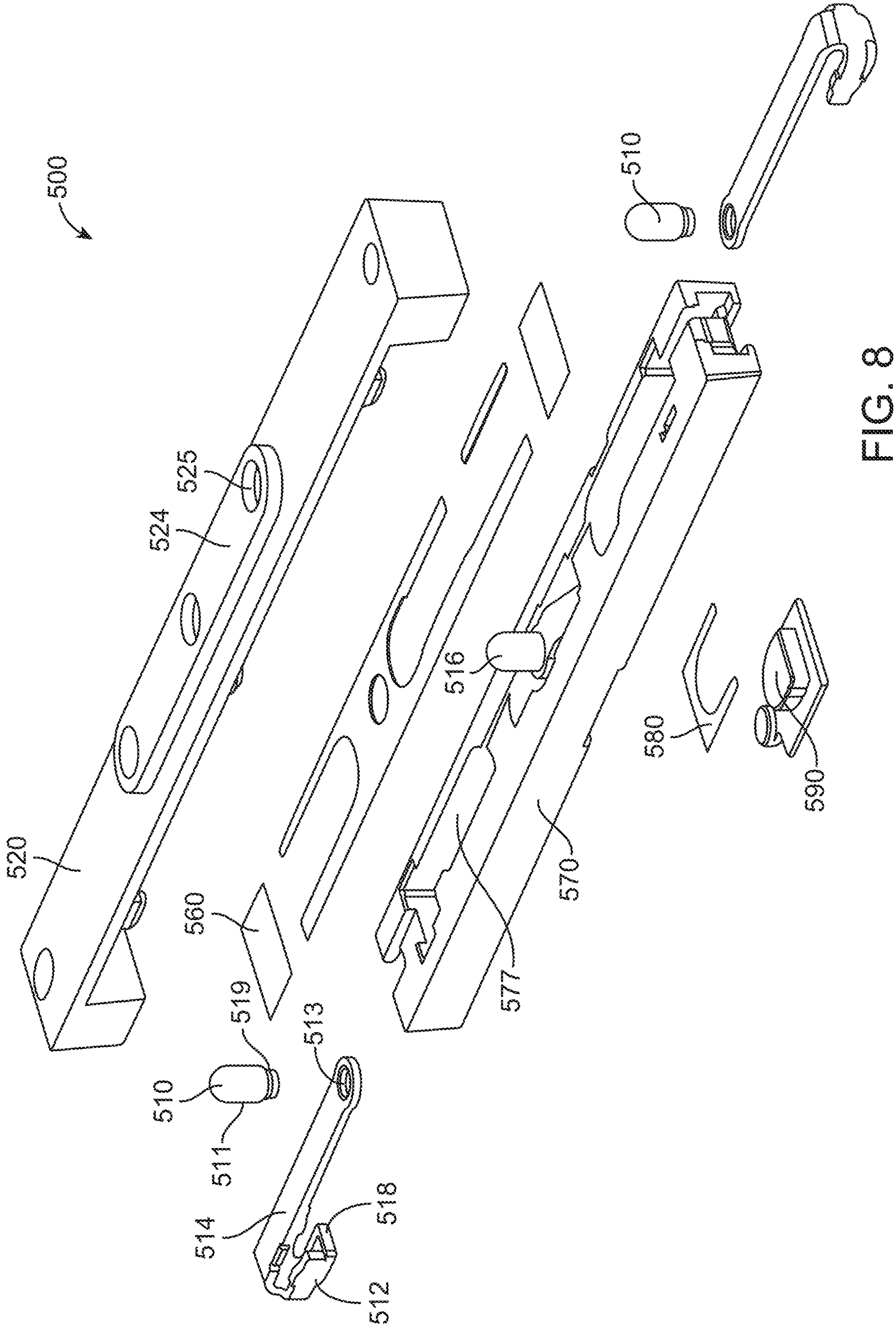
FIG. 8 is an exploded view of a connector assembly according to an embodiment of the present invention.

FIG. 8 is an exploded view of a connector assembly according to an embodiment of the present invention. Connector assembly 500 can include top housing 520 and bottom housing 570. Top housing 520 can include raised portion 524 having a number of openings 525 for contacts 510 and central contact 516. Connector assembly 500 can include contacts 510 and central contact 516. Contacts 510 can include contacting portions 511. Contacting portion 511 can include narrowed portion 519 which can fit in opening 513 in contact body 514. Contacting portion 511 can be fixed to contact body 514 by riveting, soldering, spot welding, laser welding, or other method. Contact bodies 514 can terminate in barb 512, which can be inserted into bottom housing 570, and surface-mount contacting portions 518, which can attach to a board, such as a flexible circuit board, or other appropriate substrate (not shown.)

Bottom housing 570 can include slots 577, into which contacts 510 can be slid during assembly. Central contact 516 can be partially molded in bottom housing 570. Alternatively, central contact 516 can be inserted through a bottom of bottom housing 570. Stop 590 can be used to limited travel of central contact 516. Stop 590 can be attached to bottom housing using adhesive 580. Top housing 520 can be attached to bottom housing 570 by snaps or adhesive 560. Adhesive 560 and adhesive 580 can be a pressure sensitive adhesive, heat activated film, polyimide film, or other adhesive.

The components of these connector assemblies can be formed of various materials. For example, top contacts 210, bottom contacts 220, contacts 310, top contacts 410, bottom contacts 420, contacts 510, central contact 516 and their constituent parts and other conductive portions of the connector assemblies can be formed by drawing, machining, stamping, forging, metal-injection molding, machining, micro-machining, 3-D printing, or other manufacturing process. These conductive portions can be formed of stainless steel, steel, copper, copper titanium, phosphor bronze, or other material or combination of materials. They can be plated or coated with one or more layers of nickel, palladium, palladium-nickel, gold, or other material or combination of materials.

The nonconductive portions, such as top housing 250, bottom housing 270, housing 320, overmolding 330, top housing 450, bottom housing 570, top housing 520, and bottom housing 570 and other nonconductive portions can be formed using injection or other molding, 3-D printing, machining, or other manufacturing process. The nonconductive portions can be formed of silicon or silicone, rubber, hard rubber, plastic, nylon, glass-filled nylon, elastomers, liquid-crystal polymers (LCPs), ceramics, or other nonconductive material or combination of materials. The adhesive, such as adhesive 260, adhesive 560, and adhesive 580 can be a pressure sensitive adhesive, heat activated film, polyimide film, or other adhesive.

Embodiments of the present invention can provide connector assemblies that can allow a protective accessories to connect two electronic devices. The protective accessories can be cases, covers, or other protective accessories, though these and other embodiments of the present invention can provide connector assemblies for other types of accessories or electronic devices.

Embodiments of the present invention can provide connector assemblies that can be located in various types of devices, such as portable computing devices, tablet computers, desktop computers, laptops, all-in-one computers, wearable computing devices, cell phones, smart phones, media phones, storage devices, keyboards, covers, cases, portable media players, navigation systems, monitors, power supplies, adapters, remote control devices, chargers, and other devices. These devices can include connector assemblies that can provide pathways for signals and power compliant with various standards such as one of the Universal Serial Bus (USB) standards including USB Type-C, HDMI, DVI, Ethernet, DisplayPort, Thunderbolt, Lightning, JTAG, TAP, DART, UARTs, clock signals, power signals, and other types of standard, non-standard, and proprietary interfaces and combinations thereof that have been developed, are being developed, or will be developed in the future. In one example, the connector assemblies can be used to convey a data signal, a power supply, and ground. In various embodiments of the present invention, the data signal can be unidirectional or bidirectional and the power supply can be unidirectional or bidirectional.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector assembly for an intermediate accessory, the connector assembly comprising:

- a plurality of top contacts, each top contact comprising:
  - a cap;
  - a terminal comprising a plurality of feet; and
  - a spring at least partially housed by the cap and the terminal, the spring to bias the cap and to allow the cap to be depressed into the terminal;
- a top housing having a plurality of openings, each opening for a cap of a corresponding top contact in the plurality of top contacts;
- a plurality of bottom contacts having a top surface and a bottom contacting surface, wherein the plurality of feet of each terminal are fixed to a top surface of a corresponding bottom contact; and
- a bottom housing molded around portions of the plurality of bottom contacts.

2. The connector assembly of claim 1 wherein the top contacts are spaced at a first pitch and the bottom contacts are spaced at a second pitch, the second pitch different than the first pitch.

3. The connector assembly of claim 1 wherein the top contacts are spaced at a first pitch and the bottom contacts are spaced at a second pitch, the second pitch larger than the first pitch.

4. The connector assembly of claim 3 wherein the top housing comprises a raised surface around the plurality of openings.

5. The connector assembly of claim 4 wherein for each top contact, the cap includes a recess inside the cap, and the spring extends from the recess in the cap to the bottom housing.

6. The connector assembly of claim 5 wherein the plurality of feet of each terminal are fixed to a top surface of a corresponding bottom contact with one of soldering, spot-welding, or laser welding.

7. The connector assembly of claim 6 wherein a bottom side of the top housing includes an alignment tab to fit in a corresponding alignment hole in a top side of the bottom housing.

8. The connector assembly of claim 6 wherein the top housing is fixed to the bottom housing with a layer of adhesive.

9. The connector assembly of claim 6 wherein the top housing is shaped to fit in a recess in the bottom housing.

10. The connector assembly of claim 6 wherein the intermediate accessory is a case for an electronic device.

11. An electronic system comprising:

an intermediate accessory comprising a second connector assembly, the second connector assembly comprising:

a plurality of top contacts, wherein each top contact can physically and electrically connect to a corresponding contact in a first plurality of contacts in a first connector assembly in a first electronic device, each top contact comprising:

a cap;

a terminal comprising a plurality of feet; and a spring at least partially housed by the cap and the terminal, the spring to bias the cap and to allow the cap to be depressed into the terminal;

a top housing having a plurality of openings, each opening for a cap of a corresponding top contact in the plurality of top contacts;

a plurality of bottom contacts having a top surface and a bottom contacting surface, wherein the plurality of feet of each terminal are fixed to a top surface of a corresponding bottom contact; and a bottom housing molded around portions of the plurality of bottom contacts; and a second electronic device comprising a third connector assembly, the third connector assembly comprising:

a housing having a plurality of slots and a plurality of openings;

a second plurality of contacts, wherein each contact in the second plurality of contacts can contact physically and electrically connect to a corresponding contact in the plurality of bottom contacts, each contact having a contacting portion attached to a first end of a contact body, wherein the contact body is angled away from a bottom of the housing such that the contacting portion can be depressed into the housing; and an overmolded portion formed over a second end of each contact body, the second end opposite the first end.

12. The electronic system of claim 11 wherein the top contacts are spaced at a first pitch and the bottom contacts are spaced at a second pitch, the second pitch different than the first pitch.

13. The electronic system of claim 11 wherein the top contacts are spaced at a first pitch and the bottom contacts are spaced at a second pitch, the second pitch larger than the first pitch.

14. The electronic system of claim 13 wherein the top housing is shaped to fit in a recess in the bottom housing.

15. An electronic system comprising:

an intermediate accessory comprising a second connector assembly, the second connector assembly comprising:

a plurality of top contacts, wherein each top contact can physically and electrically connect to a corresponding contact in a first plurality of contacts in a first connector assembly in a first electronic device, each top contact comprising:

a cap;

a terminal comprising a plurality of feet; and a spring at least partially housed by the cap and the terminal, the spring to bias the cap and to allow the cap to be depressed into the terminal;

a top housing having a plurality of openings, each opening for a cap of a corresponding top contact in the plurality of top contacts;

a plurality of bottom contacts having a top surface and a bottom contacting surface, wherein the plurality of feet of each terminal are fixed to a top surface of a corresponding bottom contact; and a bottom housing molded around portions of the plurality of bottom contacts; and a second electronic device comprising a third connector assembly, the third connector assembly comprising:

a second plurality of contacts, wherein each contact in the second plurality of contacts can physically and electrically connect to a corresponding contact in the plurality of bottom contacts, each contact comprising a contacting portion at a first end and a surface-mount contacting portion at a second end; and a housing supporting the second plurality of contacts.

16. The electronic system of claim 15 wherein the top contacts are spaced at a first pitch and the bottom contacts are spaced at a second pitch, the second pitch different than the first pitch.

17. The electronic system of claim 15 wherein the top contacts are spaced at a first pitch and the bottom contacts are spaced at a second pitch, the second pitch larger than the first pitch.

18. The electronic system of claim 17 wherein the second plurality of contacts comprises a central contact and two outside contacts, wherein each outside contacts further comprise a barb near the second end of the contact, the barb to be inserted into the housing, and wherein the housing is molded around a portion of the central contact.

* * * * *